March 29, 1966 C. A. HUGHEY ETAL 3,243,809
DRIFT ANGLE GROUND SPEED ATTACHMENT FOR AIRBORNE RADAR
Filed April 27, 1964
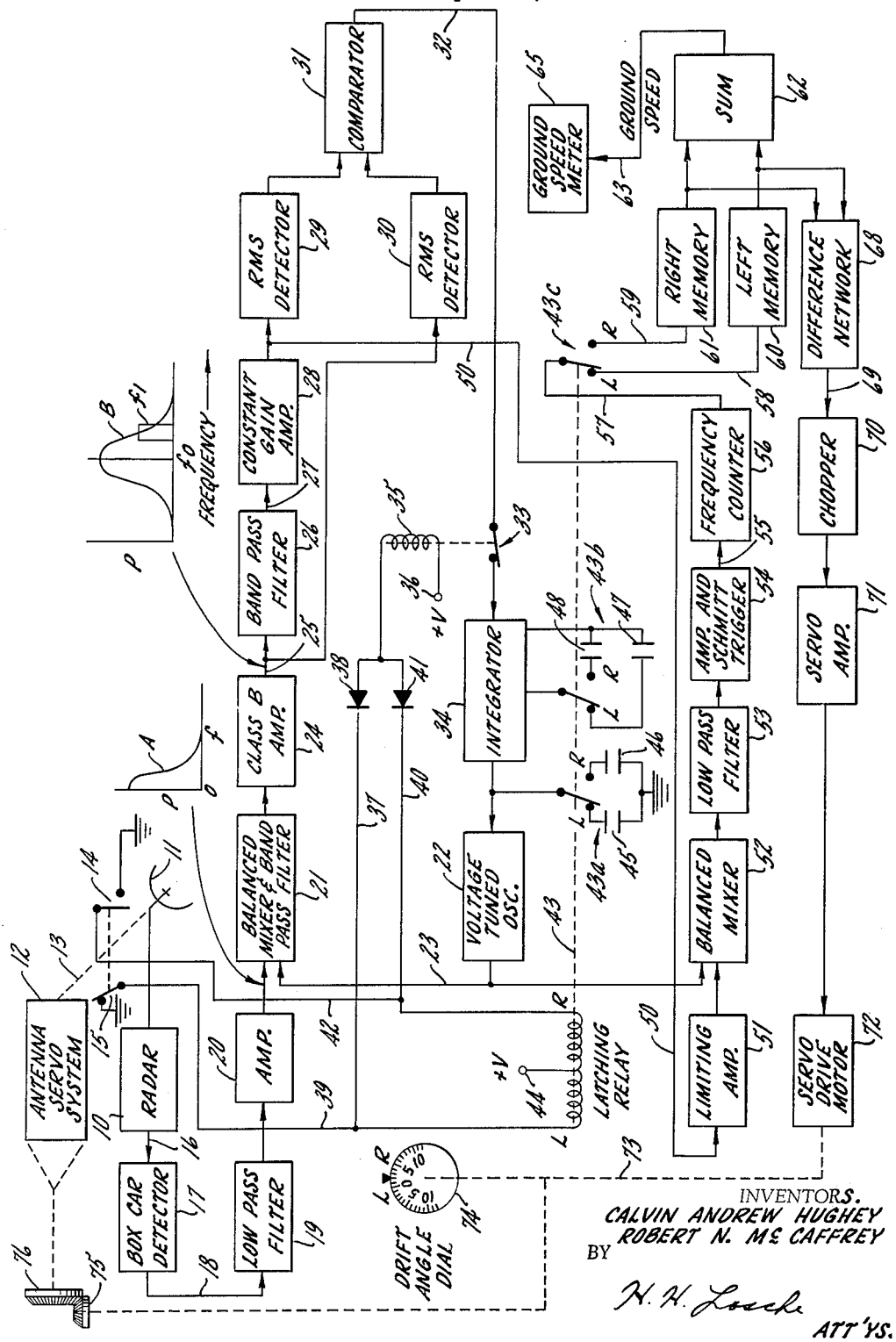
INVENTORS.
CALVIN ANDREW HUGHEY
ROBERT N. McCAFFREY
BY
H. H. Losche
ATT'YS.

United States Patent Office 3,243,809
Patented Mar. 29, 1966

3,243,809
DRIFT ANGLE GROUND SPEED ATTACHMENT
FOR AIRBORNE RADAR
Calvin A. Hughey and Robert N. McCaffrey, Indianapolis, Ind., assignors to the United States of America as represented by the Secretary of the Navy
Filed Apr. 27, 1964, Ser. No. 363,684
11 Claims. (Cl. 343—9)

The invention described herein may be manufactured and used by or for the Government of the United States of America for governmental purposes without payment of any royalties thereon or therefor.

This invention relates to drift angle computers and ground speed computers for aircraft radar systems and more particularly to a circuit means attachable to an incoherent pulse type airborne radar that will automatically or continuously determine both ground speed along the flight path or ground track of the air craft, and drift angle, which is the angle between the aircraft heading or boresight axis of the aircraft and the flight path or ground track. This is accomplished by sampling the radar return at right and left positions of the antenna scan and utilizes the variations in the radar return signal due to the Doppler effect.

To maneuver an aircraft over a prescribed course to a destination, in the absence of ground contact by radio communication or sight of landmarks, is most difficult, if not impossible, without good instrumentation in the aircraft. The reason that aircraft cannot be flown on a true course in alignment with the heading or boresight axis of the aircraft is because the wind or air currents meet the aircraft at continuing and varying angles and at continuously varying strength or velocity which attempts to deflect the aircraft off course. While aircraft navigation can be successfully carried out by radio communication with points on the ground, these radio aids will not be available in time of war and it is most desirable to have self-contained instrumentation in the aircraft to provide navigation personnel with the speed and drift of the aircraft so that corrective factors may be taken along the course to destination. On promising means of providing self-contained instrumentation to develop ground speed and drift angle, two essential bits of information needed for aircraft navigation, is in using information from the aircraft radar. It is known that if a radar beam of pulsed radiated energy is directed forwardly and downwardly to strike the earth or water surface, a part of that energy will be reflected to the aircraft by ground or water scattering, or "diffuse reflections." By taking samples of the reflected radar energy from equiangular positions on opposite sides to the right and left of the center of radar antenna oscillation, a Doppler spectrum from each position can be compared to determine whether drift from the aircraft boresight axis or heading is occurring and to determine the speed of the aircraft with respect to the ground along ground track. The Doppler spectrum results from the scattering particles reflecting the radar energy back to the radar receiver antenna as echoes, these echoes producing a density spectrum which is a function of aircraft velocity and the azimuth angle of the antenna relative to the ground track or flight path. With good instrumentation the aircraft pilot will more nearly accomplish coincidence of the aircraft heading or ground track and the prescribed course.

In the present invention the sampled radar signals, taken at equiangular positions right and left of the centerline of oscillation of the radar antenna, are used in a circuit attachment to the radar to develop ground speed and drift angle of the aircraft. The radar antenna could also be one designed for 360° of scan where samples are taken on opposite sides of a line defined as being midway between the right and left sample positions. This circuit attachment utilizes the power vs. frequency spectrum which exists in the form of amplitude modulation of the range-gated ground return signals of an airborne pulse radar due to the Doppler effect. The spectrums are extracted from the right and left sampled radar signals, and translated in frequency for each sample by being mixed with the output of a voltage-controlled oscillator. This mixed frequency spectrum for each sample is conducted through two channels to a comparator, one channel of which has a band-pass filter to pass a small predetermined band of fixed frequency, and a constant-gain amplifier to amplify the filter output by a predetermined ratio. If the outputs of the two channels are equal, the comparator will have no output. If they are not equal, the error signal from the comparator will change the control voltage to the voltage-controlled oscillator, and the spectrum will shift in frequency until the equilibrium point is reached.

The output of the band-pass filter and constant gain amplifier is mixed in a second mixer with the output of the voltage-controlled oscillator. By eliminating the higher output frequencies by means of a filter, a signal is obtained whose frequency is equal to the difference between the band-pass filter frequency and the voltage-controlled oscillator frequency. This signal is shaped in clear cut pulses to be counted by a frequency counter. When the two signals into the comparator circuit are equal, the frequency being counted is equal to crossover frequency.

Crossover frequency is defined as follows: if the spectrum were plotted under two conditions, (1) with a signal-to-noise ratio of infinity (pure signal), and (2) with a signal-to-noise ratio of zero (pure noise), both plots being normalized for equal power, the two spectrum curves will cross at a frequency called the crossover frequency. It can be shown that any other value of signal-to-noise ratio will produce a spectrum curve that intersects the original two curves at the same crossover point. Therefore, the amplitude of the spectrum curve is independent of signal-to-noise ratio at the crossover frequency. It can also be shown that this crossover frequency is a function of ground speed and angle off ground track.

The voltage tuned oscillator is limited in its frequency variation to the higher frequency side of the mixed frequency spectrum. If the oscillator frequency is designated $f_0$ and the predetermined or fixed band-passed filter frequency is designated $f_1$, then the crossover frequency equals $f_1-f_0$. This method minimizes the effects of terrain changes on the outputs of the system. This crossover frequency is determined from both right and left sampled echo signals by a synchronized switching arrangement so that the crossover frequency from each of the right and left signals is stored. The stored frequencies of the right and left samples are summed to provide a voltage representative of the ground speed of the aircraft, and the stored frequencies are subtracted in a difference circuit to provide a voltage representative of the error in indicated drift angle. The drift angle error voltage may be used to drive a servo motor system to reposition the centerline of oscillation of the antenna with respect to the aircraft heading or boresight line, this angle between the centerline and boresight line constituting the drift angle. The particular mechanical means of doing this is more fully shown and described in the application for patent, Serial No. 45,767, filed July 27, 1960, by Charles W. May, on Drift Angle Computer, now Patent Number 3,137,848. The voltages representative of the ground speed and the drift angle are calibrated on meters or indicators for navigation personnel. It is therefore a general object of this invention to provide a circuit attachment to an incoherent pulse type aircraft radar having an antenna pointing forwardly and downwardly from an aircraft and scanning or oscillating in azimuth to take radar energy echo samples at equiangular positions right and left of a centerline of antenna oscillation, or a line midway between right and left samples of a 360° scan type antenna, to determine the speed of the aircraft along the ground track and the drift angle of the aircraft with respect to its own heading or boresight axis.

These and other objects and the attendant advantages, features, and uses will become more apparent to those of normal skill in the art as the description proceeds when considered along with the figure of drawing showing the invention partly in circuit schematic and partly in block diagram.

Referring more particularly to the figure of drawing, a radar system shown in block 10, being representative of the radar transmitter and receiver, is coupled to an antenna 11, which antenna is made preferably to oscillate in azimuth a few degrees about a center of oscillation by an antenna servo system 12 coupled through any suitable antenna driving means 13, as is well understood by those skilled in the art. The antenna driving means 13, producing an oscillation of the antenna 11 about a centerline of oscillation along a downwardly and forwardly directed line of sight, where the radar 10 is carried in an aircraft, also drives switches 14 and 15 at equal and opposite angle oscillating positions of the antenna from the centerline, the right switch 14 or the left switch 15 being closed when the antenna is oscillated to its right angular sampling position or left angular sampling position, respectively, from the centerline of oscillation. The equiangular positions may be the oscillating limits of the antenna or equiangular positions on opposite sides of a line midway between the right and left sampling positions of an antenna which rotates or scans 360°.

The receiver output of radar 10 is coupled by means of conductor means 16 to a boxcar detector 17 for extracting the Doppler modulation from the radar signals. The output of the boxcar detector is by way of conductor means 18 through a low pass filter 19 to pass only the Doppler frequencies below the pulse repetition frequency (P.R.F.) and through an amplifier 20 to a balanced mixer and a band pass filter circuit 21. The output of the amplifier 20 produces a Doppler power vs. frequency spectrum, as shown by the graph A on the output lead to the balanced mixer and band pass filter 21. This Doppler power vs. frequency spectrum, as shown by A, is mixed with a frequency from a voltage tuned oscillator 22 by way of the conductor means 23. The mixer 21 output is amplified in a class B amplifier 24 to produce on its output 25 the spectrum A after it has been translated in frequency, as shown in graph B. The output 25 is a branch conductor, one branch of which applies the mixed frequency or signal spectrum B to a band pass filter 26, the output 27 of which is coupled as an input to a constant gain amplifier 28. The output of the constant gain amplifier 28 is coupled through a root mean square (R.M.S.) detector 29 while the output conductor 25 in the second channel is coupled directly to a R.M.S. detector 30, the output of both R.M.S. detectors 29 and 30 being coupled to a comparator circuit 31. The constant gain amplifier 28 has a constant gain selected such that the ratio of powers passed to detectors 29 and 30 is equal to one (1) when the frequency passed by the band pass filter less the center frequency of the mixed frequency spectrum B is equal to the crossover frequency of the applied spectrum or $f_1-f_0$=crossover frequency. It is important to this invention that the loss in power resulting from extracting a narrow band out of the power vs. frequency spectrum B by the band pass filter 26 be returned by the gain of the amplifier 28 to maintain a zero comparator output at the precise crossover frequency. The band pass filter 26 passes only a narrow band of the frequency spectrum B and this narrow band, raised in power by the constant gain amplifier 28, is compared with the total spectrum B. Whenever the output of detector 29 is not equal to the output of detector 30, the comparator will produce a direct current error voltage signal on its output 32 since the R.M.S. detectors 29 and 30 each develop a direct current voltage from the power spectrums applied to their inputs. The output 32 of comparator 31 is coupled through a relay switch 33 to an integrating circuit 34, the output of the integrator 34 being coupled as the voltage control circuit of the voltage tuned oscillator 22 to vary the frequency of the oscillations on the output 23 in accordance with the error voltage coming from the integrator 34. The relay switch 33 is under the control of a relay actuator coil 35 which is in circuit from a positive voltage source 36 through one branch conductor 37 having a diode 38 to a conductor 39 coupled to the switch blade of the left antenna switch 15. The coil 35 is also coupled through the branch conductor 40, through a diode 41, and through a conductor 42 to the right antenna switch 14. The conductor 39 from the left antenna switch 15 is coupled through a left coil of a latching relay actuator switch 43 and the conductor 42 is coupled from the right antenna switch 14 through the right latching relay coil of the latching relay switch 43 to a positive voltage source coupled to the central contact of the relay coil at 44. The latching relay switch 43 controls three sets of alternately seated contacts 43a, 43b, and 43c. The left and right contacts of relay switch 43a are each coupled to capacitors 45 and 46, respectively, with the switch blade thereof being coupled to the output of the integrator 34, being the input to the voltage tuned oscillator 22. The left and right contacts of the latching relay switch 43b are each coupled to capacitors 47 and 48 in common to the integrator while the switch blade thereof is coupled to the integrator to switch capacitors for each of the left and right antenna positions of the radar antenna 11. As may be realized from the above description, if the left antenna switch 15, for example, is making contact by virtue of the antenna passing to its left extreme or equiangular position of sampling oscillation, the latching relay 43 will pull switches 43a, 43b, and 43c to the left terminals as shown in this figure of drawing and will hold the switches in this position until the right antenna switch 14 makes contact. In like manner, the latching relay switch 43 will maintain the right contacts closed until the left antenna switch 15 closes. On the other hand, the relay switch 33 will be closed only so long as either antenna switch 14 or 15 is closed. As may now become clear, the oscillator 22 is tuned for each sampled left and right antenna position to produce the power vs. frequency spectrum B for each left and right sampling position that is positioned in frequency with respect to the band pass filter frequency to produce zero error voltage on the comparator output 32 for each left and right sampling position accomplishing a tracking function to maintain the band-passed frequency of 26 at the precise crossover frequency, the equilibrium point. Switch 33 switches to cause integration of each left and right error voltage signal.

The output of the constant gain amplifier 28 in the first of the two channels to the comparator 31 is coupled by means of a branch conductor means 50 through a limiting amplifier 51 to a second balanced mixer 52. The limiting amplifier 51 produces high amplitude peaks of the band passed mixed frequency spectrum and limits this amplitude to produce a squaring function of the waveform. The balanced mixer 52 has as a second input from the output of the voltage tuned oscillator 22 by way of conductor means 23, and the output of the balanced mixer 52 is coupled through a low pass filter 53 and an amplifier and Schmitt trigger 54, in series, to produce substantially square wave pulses of the band passed mixed frequency on the output 55. Low pass filter 53 passes the difference frequency between the band passed frequency and the oscillator frequency to produce difference frequency pulses. These difference frequency pulses are counted in a frequency counter 56 to produce a direct current voltage on the output 57 representative of the difference frequency count. The output 57 from the frequency counter 56 is coupled to the switch blade of the latching relay switch 43c, the left contact output being coupled by way of conductor means 58 to a left memory circuit 60, while the right contact is coupled through a conductor means 59 to a right memory circuit 61. Accordingly, as the antenna 11 oscillates between its extreme right and left azimuth or equiangular positions of scan, switches 14 and 15 will close alternately to apply the output of the frequency counter 56 corresponding to the right memory circuit 61 and the left memory circuit 60. The outputs of the right memory and left memory circuits 61 and 60 are coupled as inputs to a sum circuit 62 to sum the memory voltages and produce the summing results on an output 63 to a ground speed meter 65 calibrated to indicate ground speed in knots or miles per hour. Whenever the output of the comparator 31 on the conductor means 32 is reduced to zero error voltage for both left and right antenna positions, such that the frequency $f_1$ is precisely at the crossover frequency at which times the power inputs to the R.M.S. detectors 29 and 30 are equal for each left and right sampling position, the output 55 of the Schmitt trigger 54 will represent the crossover frequency and the summed voltage output at 63 will be representative of the ground speed which is calibrated in the ground speed meter to give aircraft personnel a direct reading of knots or miles per hour. The outputs of the left memory and right memory circuits 60 and 61 are coupled likewise to a difference network 68 to obtain a difference voltage on the output 69 of the difference network 68 which is chopped by a chopper circuit 70 and the chopped voltage is applied to a servo amplifier 71. The servo amplifier 71 drives a servo drive motor 72 which, through its output shaft 73, drives a drift angle meter or dial 74 and also the support or body of the antenna servo system 12 through cabling or gearing means such as gears 75 and 76, shown herein for illustrative purposes only. The means of driving the antenna servo system by a servo drive motor to change the center of oscillation of the antenna 11 is more fully shown and described in the prior mentioned patent application of Charles W. May and will not be described further herein.

*Operation*

In the operation of the device let it be assumed that the radar 10 and the antenna 11 are in an aircraft with the antenna 11 directed forwardly and downwardly from the aircraft to receive echo signal returns from scatters on the ground or water. Let it be assumed further that a steady lateral wind force is acting on the aircraft causing its heading to be different than its ground track as shown by a drift angle to the right on the drift angle dial 74 in the figure of drawing. Assuming that this is a flying condition in which there are no error voltages coming out of the comparator 31 and no error drift angle voltages coming out of the difference network 68, the band passed frequency, $f_1$, the center frequency of which may be 48 kilocycles for the purpose of an operative example, is precisely centered on the crossover frequency of the power-frequency spectrum B for both right and left antenna samples. Under this condition the powers delivered to the R.M.S. detectors 29 and 30 for each right and left sample are equal delivering equal voltages to the comparator 31. While the band passed mixed frequency spectrum $f_1$ is of small power, the constant gain amplifier increases the power of this band passed mixed frequency spectrum at the crossover frequency to be equal to the corresponding mixed frequency spectrum B. This is an equilibrium state which the circuit will strive to maintain. Also, under these conditions the balanced mixer 52 mixes the band passed frequency out of the constant gain amplifier 28 with the oscillator 22 frequency. The high frequencies are eliminated by the low pass filter 53 to obtain a frequency equal to the difference between the band passed mixed frequency and the oscillator frequency. This difference frequency is counted by the frequency counter 56 and is equal to the crossover frequency. A direct current voltage results from the counter 56 for each right and left antenna sample which voltages are stored in the right and left memory means 61 and 60, respectively. In this example, the right and left memory voltages are equal which produce no output from the difference circuit 68, showing no drift angle error in the aircraft flight pattern from the drift angle on the dial 74. A summation of the right and left memory voltages in the sum circuit 62 will provide a sum voltage that is translated to knots or miles per hour in the ground speed meter 65.

Now let it be assumed as a second example that the power or strength of the crosswind changes tending to change the aircraft flight direction. The power-frequency spectrum for the right antenna sample will now be different from the power-frequency spectrum for the left antenna sample, these samples being taken as the right antenna switch 14 or the left antenna switch 15 close. The latching relay switches 43a, 43b, and 43c are switched in synchronism with the closing of the antenna sampling switches 14 and 15 caused by antenna oscillation. The switching of 43a and 43b switches the integrator 34 capacitors for the right and left antenna samples. Since the right and left power-frequency spectrums are now unequal, and both have crossover frequencies which are different than before, the comparator will produce an error voltage for tuning the oscillator 22 for each right and left antenna sample. Accordingly, the circuits must produce two tracking functions. First, the crossover frequency tracking loop will cause $f_1$ to track on the power-frequency spectrum B at the crossover frequency for each right and left sample. Second, the loop will, in co-operation with the drift angle error driving loop, operate to equalize the power-frequency spectrum B for the right and left antenna samples to reduce the difference network 68 output error to zero.

At the same time in this second example the frequency count from the counter 56 will be different for the right and left antenna samples producing different right and left voltage memories on 61 and 60, respectively. The sum of the memory voltages will produce a correct ground speed indication, but a true drift angle indication will not be reached until the memory voltages in 61 and 60 are equal. The latching relay switch contacts 43c apply the right and left signals to the respective memory devices 61 and 60 in synchronism with the antenna samples, and the difference determined in the network 68 is the drift angle error voltage used to drive the antenna servo system 12 such that it will cause the antenna to sample in equiangular positions on opposite sides of ground track. As the drift angle error drives the servo system loop to reposition the center of antenna sampling, the drift angle dial 74 will be driven accordingly to register the angle between the boresight axis of the aircraft and its actual ground track. In this manner aircraft personnel can get continuous indication of the aircraft ground speed and drift angle for proper aircraft navigation.

It is to be understood that the tracking functions of the two-channel crossover frequency tracking loop is quite rapid, but the drift angle error servo loop is slower because of inertial loads which require change.

In the general operation of this ground speed and drift angle attachment, changes in crosswind energy and direction against the aircraft carrying this equipment will cause immediate changes in the power-frequency spectrums B for right and left antenna samples which are constantly tracked in the crossover frequency tracking loop. At the same time the drift angle error servo system loop will continuously operate to reduce the difference of the stored voltages in the memory devices 60 and 61 to zero to give proper drift angle indications on the drift angle dial 74. The aircraft pilot personnel can maneuver the aircraft to maintain it on course or the drift angle servo control system may be coupled to the autopilot to maintain the aircraft on course, as desired. The attachment is versatile in that it can be readily adaptable to radar equipment already operating in aircraft and it is of minimum size, weight, and complexity making it readily usable in fighter aircraft.

While many modifications and changes may be made in the constructional details and features of this invention to accomplish the automatic and continuous indications of drift angle and speed of the aircraft as shown from the preferred embodiment of this invention, it is to be understood that we desire to be limited in our invention only by the scope of the appended claims.

We claim:

1. A drift angle and ground speed circuit attachment for a radar providing sampled radar echo signals at positions right and left of a center of oscillation of the radar antenna comprising:

means mixing voltage oscillations from a voltage tuned oscillator source with said right and left echo signals;

means channeling said mixed right and left echo signals in two channels, each channel having a frequency-to-direct-current converter means therein, one channel having a band pass filter therein to pass a band of right and left mixed echo signals;

comparator means coupled to receive said right and left echo converted signals and said band passed right and left echo converted signals to produce a right and left direct current voltage error signal coupled to control said voltage tuned oscillator to reduce said error signals to zero;

means mixing said voltage oscillations from said voltage tuned oscillator with said mixed band passed right and left echo signals to produce second mixed frequency signals; and means for counting said second mixed frequency signals for said right and left echo signals and storing same, the difference between said right and left stored count being representative of said drift angle and the sum of said right and left stored count being representative of said speed of the radar with respect to reflecting objects producing said radar echo signals.

2. A drift angle and ground speed circuit attachment for a radar providing sampled radar echo signals at positions right and left of a center of oscillation of the radar antenna comprising:

a voltage tuned frequency signal source coupled to mix the signal frequency thereof with said sampled right and left radar echo signals to produce right and left first mixed frequency spectrums;

two channels coupled to receive said right and left first mixed frequency spectrums, each channel having a detector therein, and one channel having a band pass filter to pass a narrow predetermined frequency band and also having a constant gain amplifier to produce a power output of the narrow predetermined frequency band which power output is compared with the power of the Doppler frequency spectrum, said constant gain amplifier being calibrated so that when the two powers are equal the band pass filter will correspond to a crossover point in the frequency spectrum at which crossover point the amplitude is independent of the signal-to-noise ratio;

means comparing the power outputs of said two channels to produce right and left error voltages coupled to said voltage tuned frequency signal source to control the frequency of said voltage tuned frequency signal source for each right and left echo signal to reduce said error voltages to zero;

means mixing said band of said frequency spectrum from said one channel for each right and left first mixed frequencies with the right and left frequency signals from said voltage tuned frequency signal source of each right and left radar sample to produce second right and left mixed frequency spectrums;

means counting the frequency of each right and left second mixed frequency spectrum for each right and left radar sample and converting same to direct current voltages proportional to the frequency count; and means memorizing said direct current voltages for each right and left radar sample, the difference in these memorized voltages being representative of the drift angle error and the sum of these memorized voltages being representative of the ground speed whereby drift angle and ground speed are extracted from aircraft radar information.

3. A drift angle and ground speed circuit attachment as set forth in claim 2 wherein said detectors are root mean square detectors, and said coupling of said error voltages to said voltage tuned frequency signal source is interrupted during intervals between right and left sampled echo signals and said interrupted error signals are integrated for controlling said voltage tuned frequency signal source.

4. A drift angle and ground speed circuit attachment as set forth in claim 3 wherein said integration is provided by an integrator having switchable circuit capacitors coupled to be switchable in synchronism with the sampling of said sampled right and left echo signals.

5. A drift angle and ground speed circuit attachment for utilizing the Doppler echo spectrum of the reflected signals from the right and left sample positions of a center of oscillation of the antenna of a radar comprising:

a low pass filter coupled to receive the Doppler echo spectrums of the right and left antenna positions of the radar, said low pass filter being constructed and arranged to pass only Doppler frequencies below the radar pulse repetition frequency;

an input voltage signal synchronzed with each right and left antenna sample position of the radar antenna;

a voltage tuned oscillator for producing a variable frequency signal for each right and left sample position;

a first mixer means coupled to mix said right and left Doppler frequency spectrums with said corresponding right and left variable frequency signals to produce right and left mixed frequency spectrums;

two channels coupled to receive said right and left mixed frequency spectrums, each channel having a detector therein, and one channel having a band pass filter to pass a narrow predetermined frequency band and also having a constant gain amplifier to produce a power output of the narrow predetermined frequency band which power output is compared with the power of the Doppler frequency spectrum, said constant gain amplifier being calibrated so that when the two powers are equal the band pass filter will correspond to a crossover point in the frequency spectrum at which crossover point the amplitude is independent of the signal-to-noise ratio;

a comparator coupled to the outputs of said two channels to compare the powers of the detected band passed frequency spectrums and the corresponding mixed frequency spectrums to produce right and left error voltages;

means coupling the output of said comparator to said voltage tuned oscillator through an interrupter and through an integrating network having switches to switch integrating capacitors to cause said oscillator frequency to vary to a point where the power of the band passed mixed frequency spectrum equals the power of said first mixed frequency spectrum, said interrupter and integrator switches being coupled to said input voltage signals of right and left antenna positions;

a second mixing means coupled to mix the right end left band passed frequency spectrums and the corresponding right and left variable frequency signals to produce second right and left mixed frequency spectrums;

a low pass filter for passing the difference frequency of said band passed and variable frequencies, a wave squaring circuit, and a frequency counter coupled in series to the output of said second mixing means;

right and left memory means coupled through an alternately switched switch means to the output of said frequency counter, said switch means being coupled to the input voltage signals of each right and left antenna position to switch said switch means to memorize right and left frequency counter outputs of the difference frequency; and sum and difference circuit means coupled to the output of said right and left memory means to provide a sum voltage signal representative of the ground speed of the radar in space with respect to the ground and a difference voltage signal representative of the error in drift angle of the radar in space from a given course over ground.

6. A drift angle and ground speed circuit attachment as set forth in claim 5 wherein said switches to switch said integrating capacitors and said switch means on the output of said frequency counter are switches in a holding relay which hold the switch contacts in the right contact position until the left input voltage signal is received and holds the switch contacts in the left contact position until the right input voltage signal is received.

7. A drift angle and ground speed circuit attachment as set forth in claim 6 wherein said detectors are root mean square detectors.

8. A drift angle and ground speed circuit attachment for utilizing the Doppler echo spectrum of the reflected signals of an airborne radar comprising:

an airborne incoherent pulse radar having an antenna driven by a servo motive means to drive the antenna in angular azimuthal oscillations about a centerline and operative to obtain echo reflected ground signal samples at equal right and left angular positions from said centerline;

a boxcar detector and a low pass filter coupled to said radar in series to pass the Doppler echo spectrum from said right and left samples;

a voltage tuned oscillator for producing a variable frequency voltage for each right and left Doppler echo spectrum;

a first mixer coupled to said low pass filter and said oscillator to mix said Doppler echo spectrum and said variable frequency voltage for each corresponding right and left samples;

two channels coupled to the output of said first mixer, each having a root mean square detector therein, and one channel having a band pass filter to pass a narrow predetermined frequency band and also having a constant gain amplifier to produce a power output of the narrow predetermined frequency band which power output is compared with the power of the Doppler frequency spectrum, said constant gain amplifier being calibrated so that when the two powers are equal the band pass filter will correspond to a crossover point in the frequency spectrum at which crossover point the amplitude is independent of the signal-to-noise ratio;

a comparator coupled to the outputs of said detector of each channel to compare the power of the detected right and left mixed frequency spectrums with the power of the detected narrow predetermined frequency band of the right and left mixed frequency spectrums to produce corresponding right and left output error voltages on an output thereof, said output being coupled through an integrator network having integrating capacitors to said voltage tuned oscillator to vary the output frequency thereof for each corresponding right and left sample to cause said oscillator frequency to shift until the power outputs of said two channels become equal thereby reducing said error voltage to zero for each right and left sample;

a switch means including an antenna switch in said radar servo motive antenna driving means for each right and left radar sampling position, a latching relay coupled in circuit through each right and left antenna switch and having alternately seated contacts coupled to said integrator network to change the integrating capacitors for said right and left error voltages for application to said voltage tuned oscillator, and having other alternately seated switch contacts, said latching relay being constructed and arranged to hold said alternately seated contacts in one contact position until the other antenna switch closes;

a second mixer coupled to the output of said constant gain amplifier in said one channel and to said voltage tuned oscillator to produce a crossover frequency for each right and left sample when said corresponding right and left error voltages are zero;

a low pass filter for passing the difference frequency from said constant gain amplifier and from said oscillator, a squaring circuit, and a frequency counter coupled in series to said second mixer to produce right and left direct current voltages on the frequency counter output proportional to said difference frequency count;

a right memory means and a left memory means coupled to be alternately switched in circuit with the output of said frequency counter through said other alternately seated contacts to memorize the right and left frequency counts as a direct current voltage proportional to the count;

a summing network coupled to the output of each memory means to produce a sum voltage representative of the ground speed of the airborne radar and having a difference network coupled to the output of each memory means to produce a difference voltage representative of an error in the drift angle between the antenna centerline of oscillation and the airborne vehicle boresight line; and means associated with said servo motive means and coupled to said difference circuit to drive said servo motive means to shift said centerline in accordance with said difference voltage to establish said drift angle between the aircraft heading and the centerline of oscillation of the radar antenna to reduce the error in drift angle to zero.

9. A drift angle and ground speed circuit attachment as set forth in claim 8 wherein said means associated with said servo motive means has said coupling through a chopper circuit and a servo amplifier from said difference network, and said servo amplifier drives a servo motor mechanically connected to said servo motive means to shift said centerline of oscillation of said antenna.

10. A drift angle and ground speed circuit attachment as set forth in claim 9 wherein said mechanical connection of said servo motor and said servo motive means drives a drift angle indicator.

11. A drift angle and ground speed circuit attachment as set forth in claim 10 wherein said coupling of said second mixer with the output of said constant gain amplifier in said one channel limits the signal amplitude by a limiter network.

No references cited.

CHESTER L. JUSTUS, *Primary Examiner.*

R. D. BENNETT, *Assistant Examiner.*